United States Patent [19]

Bhagwat

[11] Patent Number: 4,842,423
[45] Date of Patent: Jun. 27, 1989

[54] SEALED BEARING ASSEMBLY
[75] Inventor: Anil G. Bhagwat, Hemel Hempstead, England
[73] Assignee: Xerox Corporation, Stamford, Conn.
[21] Appl. No.: 172,665
[22] Filed: Mar. 24, 1988
[51] Int. Cl.⁴ .................. F16C 33/74; F16C 35/02; F16J 15/34; B65G 33/32
[52] U.S. Cl. .................. 384/130; 198/672; 277/81 R; 277/136; 277/166; 277/167.5; 384/151; 384/424; 384/439
[58] Field of Search .......... 384/130, 138, 139, 140, 384/144, 151, 416, 424, 426, 428, 439, 440; 277/94, 81 R, 167.5, 166, 137, 136, 189; 198/666, 672, 673

[56] References Cited
U.S. PATENT DOCUMENTS

| | | | |
|---|---|---|---|
| 968,390 | 8/1910 | Naëder | 277/81 |
| 1,362,039 | 12/1920 | Porteous | 277/81 X |
| 2,062,294 | 12/1936 | Cory et al. | 43/148 |
| 3,460,843 | 8/1969 | Jaeger | 277/137 X |
| 3,674,326 | 7/1972 | Kaiser | 384/151 |
| 4,077,508 | 3/1978 | Pedersen | 198/666 |
| 4,217,980 | 8/1980 | Kemp, Jr. | 384/130 X |
| 4,365,707 | 12/1982 | Kemp, Jr. | 198/672 |
| 4,449,810 | 5/1984 | Ikesue et al. | 355/3 DD |

Primary Examiner—Thomas R. Hannon
Attorney, Agent, or Firm—H. Fleischer; J. E. Beck; R. Zibelli

[57] ABSTRACT

An apparatus which seals a shaft mounted rotatably on a bearing member. At least two spaced apart annular flanges are mounted on the shaft. One of the flanges being is arranged to bear radially against the bearing member. An annular sealing member is mounted on the shaft between the two flanges in abutting relation with at least one of the flanges to form a radial seal with the bearing member.

8 Claims, 1 Drawing Sheet

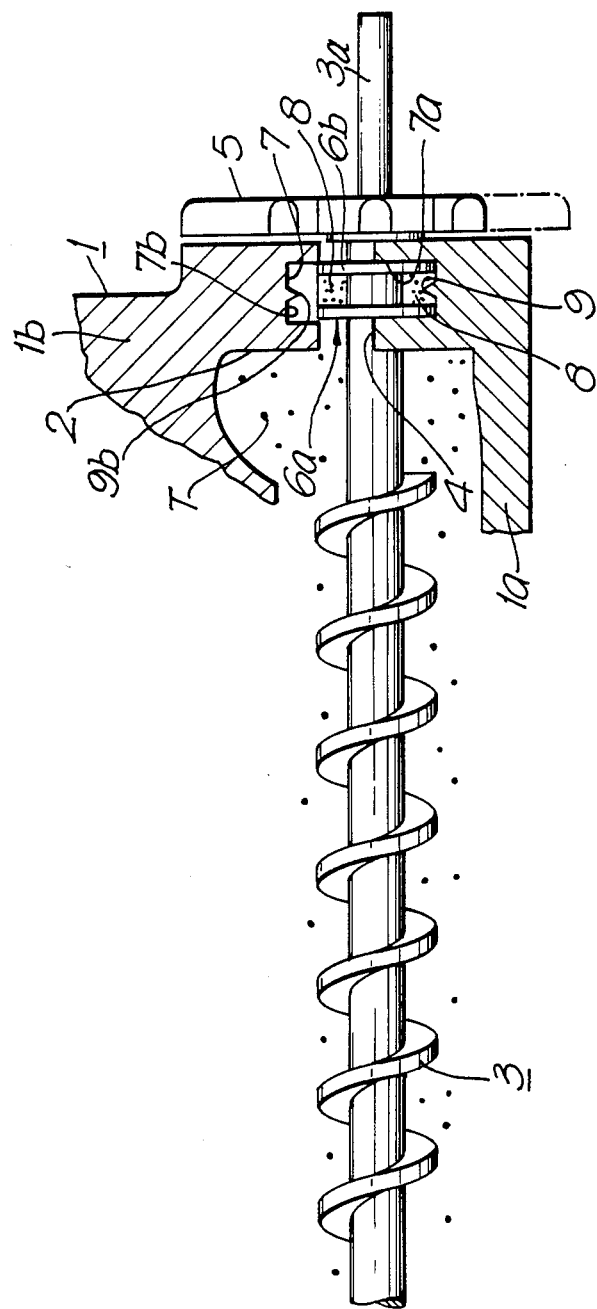

SEALED BEARING ASSEMBLY

This invention relates to an apparatus for sealing a rotating shaft mounted on a bearing member. It is particularly intended, but not exclusively, for use in a container for toner in a xerographic copier.

For example, in a zerographic copier it is known to transport toner along a conduit or container using a rotating auger. The shaft of the auger extends outside the container from where it is driven and is journaled in a bearing which has to be sealed to prevent toner from leaking out. Various approaches have been devised for sealing a rotating shaft to prevent the escape of toner. The following disclosures appear to be relevant:

U.S. Pat. No. 2,062,294, Patentee: Cary et al., Issued: Dec. 1, 1936,

U.S. Pat. No. 4,077,508, Patentee: Pedersen, Issued: Mar. 7, 1978,

U.S. Pat. No. 4,449,810 Patentee: Ikesue et al., Issued: May 22, 1984,

U.S. Pat. No. 2,062,294 discloses a dust containment and discharge unit for use in crop dusting vehicles. A dust hopper is provided which receives a feed screw. Rotation of the feed screw continuously transports dust to be distributed as desired. Felt washers are disposed on the drive shaft of the feed screw. The washers laterally engage the inner wall of the hopper to prevent leakage of dust from the apparatus.

U.S. Pat. No. 4,077,508 discloses a heavy duty sealed bearing for use with abrasive materials. The bearing employs an adaptor plate for engaging augers which are supported by the bearing from an overhead support. Magnetic seal strips are provided which attract metallic debris and prevent it from entering the bearing. A series of felt seals are secured to a cylinder surface adjacent the magnetic seals which further aid in preventing particulate material from entering the bearing. The felt seals are disposed in lateral, i.e. axial, relationship on both sides of the bearing.

U.S. Pat. No. 4,449,810 discloses an electrophotographic copying machine with a means for mixing and removing toner wherein two sealing members in the shape of rings are employed to prevent toner leakage where drive shafts of a development roller and a bucket wheel are journaled through a side wall of a developer container. The first sealing member, which may comprise a felt material, is in direct contact laterally, i.e. axially, with said side wall and a bearing. The second sealing member, made of a non-elastic material, is disposed between a step portion of the drive shafts and the first sealing member.

According to the present invention there is provided a sealed bearing and rotating shaft assembly comprising a bearing member, a shaft having an annular flange thereon, said flange being arranged to bear radially against the bearing member, and further comprising an annular sealing member accommodated on the shaft in abutting relationship with the flange to form a radial seal with the bearing member.

In accordance with one aspect of the present invention, there is provided an apparatus for sealing a shaft mounted rotatably on a bearing member. The apparatus includes a pair of spaced apart annular flanges mounted on the shaft. One of the pair of flanges is arranged to bear radially against the bearing member. An annular sealing member is accommodated on the shaft between the two flanges in abutting relation with at least one of the pair of flanges to form a radial seal with the bearing member An apparatus of this type can be manufactured simply and cheaply and is ideally suited to light-duty, limited life applications such as in the toner transport auger of a customer replaceable xerographic cassette for use in a xerographic copying machine.

In a preferred embodiment, the apparatus has two spaced apart annular flanges on the shaft. The sealing member is disposed between the flanges of the shaft. The circumferential edges of the flanges provide the bearing surfaces for the shaft, and consequently the sealing member is present within the bearing member intermediate the two bearing surfaces of the shaft with the sealing member being in radial engagement with the bearing member.

Assembly of the apparatus, in accordance with the preferred embodiment thereof, is facilitated because the two flanges provide a location for the sealing member to be inserted therebetween. Preferably, the sealing member is in the form of split ring, the split being in the form of a radial cut enabling the ring to be opened so that it can easily be slipped onto the shaft.

The sealing ring is preferably made of felt composed, for example, of cotton. The two flanges and the felt sealing ring together provide a substantial labyrinth sealing path which ensures an effective seal. The bearing member is provided with a pair of diametrically opposed pin like projections, which penetrate the sealing member to restrain the sealing member against rotation.

Other aspects of the present invention will become apparent as the following description proceeds and upon reference to the figure of the drawing which illustrates an elevational view, partially in section, of a portion of a toner transport device used in a xerographic copier, having the features of the present invention therein.

For a generally understanding of the features of the present invention, reference is made to the drawing. In the drawing, like reference numerals have been used throughout to identify identical elements. The toner transport device has a container 1 defining an elongated chamber 2 housing an auger 3 for transporting toner T along the length thereof. Toner may be supplied to the chamber 2 from a hopper (not shown) or other source in a known manner. The container 1 has a base portion 1a and a cover portion 1b which are normally firmly close together, for example by ultrasonic welding or any suitable alternative such as a snap-fit arrangement. However, for enhanced clarity in the Figure the cover 1b is shown slightly removed from the base 1a.

The shaft 3a of auger 3 extends through the container wall via an aperture 4 at the interface between the base 1a and cover 1b. A gear 5 is mounted on the shaft 3a outside the container to enable the auger to be driven by means (not shown) well-known to a person skilled in the art.

The auger shaft 3a also has two closely spaced annular flanges 6a, 6b which are accommodated in a complementary recess 7 in the container wall, which thus forms a bearing enclosing the flanges. It can be seen from the drawing that half of the bearing 7a is provided in base 1a and half 7b is provided in the cover 1b. The base 1a and cover 1b thus constitute a bearing member. It can also be seen from the drawing that the circumferential edges of the flanges 6a, 6b form the bearing surfaces for the auger shaft 3a and that they bear radially against the bearing formed by recess 7. Moreover, the flanges 6a, 6b abut the side walls of the recess 7 to prevent the shaft from moving along its axis.

The auger shaft 3a may be made of a plastics material, for example polyacetal, and the shaft 3a, the gear 5, and the flanges 6a, 6b may be molded as a one-piece unit.

A punched-out flat annulus or ring 8 of cotton felt material is inserted between the flanges 6a and 6b. To facilitate assembly the ring 8 is provided with a radial cut so that it is in the form of a split ring. The thickness of ring 8 in the axial direction is substantially the same as the spacing between flanges 6a and 6b so as to provide a close fit and fill the gap therebetween. The outer radius of ring 8 is, however, slightly greater than that of the flanges 6a, 6b so that when the container is closed the ring is compressed as it engages the bearing recess 7. The two flanges 6a, 6b and the felt ring 8 thus provide a substantial labyrinth sealing path which ensures an effective toner seal.

A pair of diametrically opposed pin-like projections 9a, 9b are molded respectively in the lower and upper halves 7a, 7b of recess 7. These projections 9a, 9b penetrate the felt sealing ring 8 to prevent it from rotating when the shaft 3b - and hence the integral flanges 6a, 6b - are rotated.

In view of the foregoing description, it will be evident to a person skilled in the art that various modifications may be made within the scope of the invention. For example, the sealing ring may be made of material other than cotton felt and may comprise two halves instead of a split ring. Also, for example, there may be more or less than two anti-rotation projections penetrating into the sealing ring. Furthermore, it is not necessary for there to be two flanges on the shaft. Indeed a single flange may suffice, and in this case the sealing member is provided in abutting relationship with the flange preferably on the outer side, but still in radial engagement with the bearing member. Moreover, the labyrinth sealing path can be substantially increased by providing three or more spaced apart flanges on the shaft with a sealing member present between each pair of flanges.

I claim:

1. An apparatus for sealing a shaft mounted rotatably on a bearing member, including:
    at least two spaced apart annular flanges mounted on the shaft, one of said flanges being arranged to bear radially against the bearing member with the bearing engaging a side of one of said flanges to prevent movement of the shaft in the direction of the longitudinal axis thereof;
    an annular sealing member accommodated on the shaft between said flanges in abutting relation with at least one of said flanges to form a radial seal with the bearing member; and
    means, secured to the bearing member and engaging said sealing member, for preventing said sealing member from rotating with the shaft.

2. An apparatus according to claim 1, wherein said sealing member is sandwiched in close-fitting relationship between said flanges.

3. An apparatus according to claim 2, wherein said preventing means includes at least one protuberance which penetrates the sealing member.

4. An apparatus for sealing a shaft mounted rotatably on a bearing member, including:
    at least two spaced apart annular flanges mounted on the shaft, one of said flanges being arranged to bear radially against the bearing member;
    an annular sealing member accommodated on the shaft between said flanges in abutting relation with at least one of said flanges to form a radial seal with the bearing member, said sealing member being sandwiched in close-fitting relationship between said flanges; and
    means, mounted on the bearing member, for preventing said sealing member from rotating with the shaft, said rotation prevention means includes a pair of diametrically opposed protuberances formed integrally on the bearing surface of the bearing member with at least one protuberance penetrating the sealing member.

5. An apparatus according to claim 4, wherein said sealing member includes a split ring.

6. An apparatus according to claim 5, wherein said sealing member includes a felt material.

7. An apparatus according to claim 6, wherein said felt material includes cotton.

8. An apparatus according to claim 7, wherein the bearing member includes a housing arranged to support said flanges and said sealing member.

* * * * *